H. C. LOCKE.
Corn Planter.
No. 77,057.
Patented April 21, 1868.
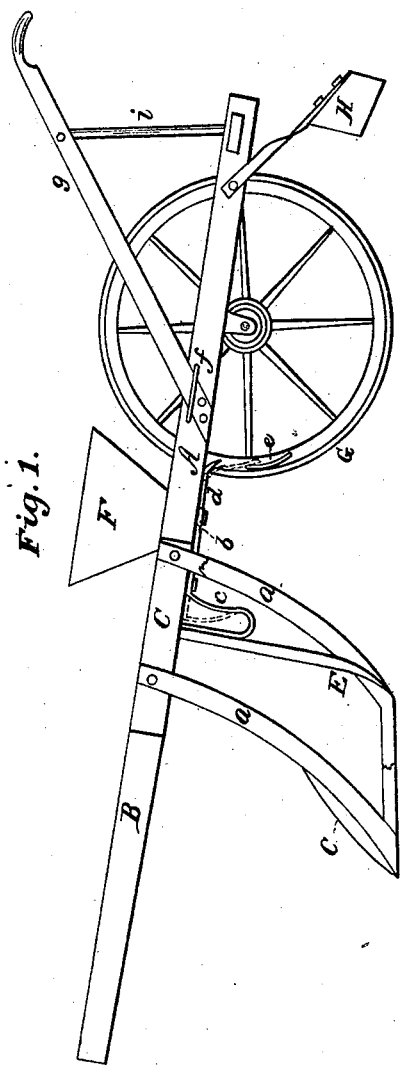
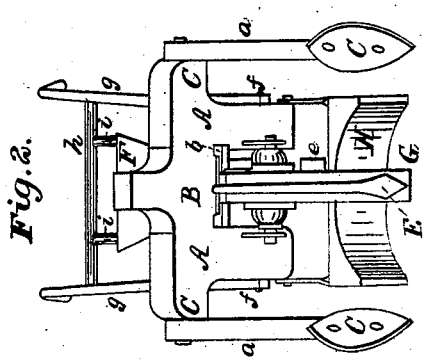
Witnesses:
R. J. Turner
Wm F. Browne
Inventor:
H. C. Locke
By his atty
R. D. O. Smith

United States Patent Office.

H. C. LOCKE, OF SOMERSVILLE, TENNESSEE.

Letters Patent No. 77,057, dated April 21, 1868.

IMPROVEMENT IN CORN-PLANTER.

*The Schedule referred to in these Letters Patent and making part of the same.*

TO ALL WHOM IT MAY CONCERN:

Be it known that I, H. C. LOCKE, of Somersville, in the county of Fayette, and State of Tennessee, have invented a new and useful Improvement in Corn-Planters; and I do hereby declare the following to be a full, clear, and exact description of the same, reference being had to the accompanying drawings, in which—

Figure 1 is a side elevation of my machine.

Figure 2 is a front elevation of the same.

My invention consists in an improved form of planter for corn or other seeds, which are to be deposited in hills at equal distances apart; and in order that others may understand the construction and operation of the same, I will proceed to particularly describe it.

A, fig. 1, represents the frame of the planter, which is constructed of two pieces of timber, forming the sides, the rear ends connected by a short piece framed in, which need be but little longer than the axle of the wheel, and the forward ends by a piece, B, which extends beyond the side-pieces, and serves as a tongue, to which the horses are attached when the planter is in use. This piece B extends back nearly to the wheel, and serves as a support for the hopper F, and is firmly secured to the side-pieces by bolts passing through the three parts, or in any other suitable manner. The forward ends of the side-pieces are made with projections on the outer edges, to which the arms, a a, of the ploughs C C are attached, and these projections should hold the arms a a at such distance apart that the ploughs shall each turn a furrow inward, so as to form a perfect ridge, in which the seed may be deposited. The arms a a are made of metal, with two standards and a connecting-sole at the bottom, of the form shown in fig. 1, curving forward as they extend downward, and to the lower forward part of each, the ploughs C C are secured by a bolt passing through the centre. The arm a, being constructed with two standards, connected at their lower ends by a connecting-bar, which acts as a sole, to steady the implement during its operation, is readily and firmly attached to the side or edge of the frame, and serves the double function of strengthening the plough-connection and regulating the operation of the same. These ploughs are so fitted to the arms a a as to each turn a furrow inward, thereby forming a proper ridge in which the seed may be placed. They are made of plates of steel or iron, as desired, and such shape as the longitudinal section of a spindle, whose length is about twice its diameter, so that when the lower points are worn away, the upper may be substituted in their places. A little to the rear of the ploughs, and midway between them, is the drill-tooth E, which is firmly secured to the frame A, and projects downward nearly as far as the points of the ploughs. This drill-tooth is pointed at the lower end, and is curved slightly forward, and its use is to open the top of the ridge formed by the ploughs, and leave a narrow and shallow trench thereon, in which the seed will fall.

On the top of the frame, just forward of the wheel, is placed the hopper F, for holding the corn or other seed to be planted, and a small hole is made downward through the frame, underneath the hopper, which hole is closed by a gate, b, on the under side of the frame. This gate slides in guides fastened to the under side of the frame, and is kept closed by the spring c pressing against the forward end of said gate. To the rear left-hand corner of the gate b is an arm, d, (or it may all be made of one piece,) which projects backward to one side of the wheel G sufficiently far to be operated by the cam e, on the side of the rim of said wheel. The cam e is of metal, and attached to one side of the rim of the wheel in such a manner that, as the wheel is turned, it will strike the arm d of the gate, and force the gate forward, thereby opening the hole below the hopper, so as to admit the passage of the desired number of kernels, and, as the cam e passes beyond the arm d, the gate is instantly closed by the spring c. The wheel G is made of any desired size, and may have two or more cams upon its side, as it may be desired to have the hills near or farther apart, and the cams e may be of such length as will allow the gate to remain open a longer or shorter time, so that a greater or less number of kernels may be deposited in the hill, as desired. To the rear of the frame is attached the dragging-block H, which drags behind the wheel, and, by its weight and shape, effectually covers the grain as it passes along the trench made by the drill-tooth F. It is slightly hollowed out on the lower surface, which is in contact with the ground, so as to better gather the loose soil removed by the drill-tooth, and leave the ridge, when complete, round and smooth.

To the sides of the frame A, at proper points, are the staples $ff$, in which handles $g\,g$ are inserted, for the better guidance of the machine. These handles are connected near the top by a cross-bar $h$, and additional strength is secured by the upright supports $i\,i$, which are secured to the main frame.

Having thus fully described my invention, what I claim as new is—

1. The reversible ploughs C C, mounted on the standards $a$, constructed and arranged substantially as described, in combination with the drill-tooth E and the seed-hopper F, as and for the purpose set forth.

2. The seed-hopper F, provided with the gate $b$, operated by the spring $c$ and cam $e$, or the wheel G, as and for the purpose described.

3. The combination of the reversible ploughs C C, drill-tooth E, and seed-hopper F, with its automatic discharging-mechanism, and the dragging coverer H, arranged and operating as described.

4. The standard $a$, constructed with two upright bars and a horizontal connection-bar at the bottom, substantially as shown and for the purpose described.

H. C. LOCKE.

Witnesses:
R. S. LOCKE,
J. A. LOCKE.